United States Patent
Frölich et al.

(10) Patent No.: US 6,922,704 B2
(45) Date of Patent: Jul. 26, 2005

(54) METHOD FOR GENERATING APPLICATION SPECIFIC INPUT FILES

(75) Inventors: Peter Frölich, Mannheim (DE); Manfred Schoelzke, Mannheim (DE); Ming Lu, Sharon, MA (US)

(73) Assignee: ABB Inc., Norwalk, CT (US)

( * ) Notice: Subject to any disclaimer, the term of this patent is extended or adjusted under 35 U.S.C. 154(b) by 349 days.

(21) Appl. No.: 09/861,217

(22) Filed: May 18, 2001

(65) Prior Publication Data

US 2002/0049789 A1 Apr. 25, 2002

(30) Foreign Application Priority Data

May 27, 2000 (DE) .......................................... 100 26 478

(51) Int. Cl.⁷ ............................ G06F 17/00; G06F 7/00
(52) U.S. Cl. ...................... 707/104.1; 707/102; 707/3; 707/101; 707/103 R
(58) Field of Search .............................. 707/104.1, 102, 707/3, 101, 103 R, 1; 700/1; 715/513; 717/106, 116, 136

(56) References Cited

U.S. PATENT DOCUMENTS

| | | | |
|---|---|---|---|
| 6,487,566 B1 * | 11/2002 | Sundaresan .................. | 715/513 |
| 6,507,856 B1 * | 1/2003 | Chen et al. .................. | 715/513 |
| 6,519,617 B1 * | 2/2003 | Wanderski et al. .......... | 715/513 |
| 6,578,192 B1 * | 6/2003 | Boehme et al. .............. | 717/115 |
| 6,590,589 B1 * | 7/2003 | Sluiman et al. .............. | 345/751 |
| 2001/0044811 A1 * | 11/2001 | Ballantyne et al. .......... | 707/513 |
| 2002/0049789 A1 * | 4/2002 | Frolich et al. .............. | 707/513 |
| 2002/0133484 A1 * | 9/2002 | Chau et al. .................... | 707/3 |

OTHER PUBLICATIONS

Hakan Zeffer: dvcenv–A Device Model Test Environment for a Full Computer System Simulator, Master Thesis Project, Microelectronic and Information Technology, Royal Institute of Technology, Sweden, Jun.–Oct., 2002.*
IBM: Using XML on z/OS and OS/390 for Application Integration, Nov. 2001.*
J. Beckers: Redesign Input File OMS, WL|Delft Hydraulics, Jul. 10, 2002.*
Mustafa Ozden: A Binary Encoding for Efficient XML Processing, Master Thesis, Techische Universitat Hamburg–Harburg, German, 17th Dec. 2002.*

* cited by examiner

*Primary Examiner*—Luke S. Wassum
*Assistant Examiner*—Kuen S. Lu
(74) *Attorney, Agent, or Firm*—Michael M. Rickin, Esq.; Paul R. Katterle, Esq.

(57) ABSTRACT

A method for generating application-specific input files for applications that require input files in varying file formats, where data for specifying industrial equipment are stored in a database of a computer system as XML-formatted files, which are based on a class model, and a modular transformation into at least one application-specific input file takes place. One or more of the XML files are loaded into a memory, decoded, interpreted and verified—particularly with regard to semantics and consistency. In the absence of an error specifications of objects of the industrial equipment are generated in XML format based on the verified XML files by using an interface containing descriptions of the functionality of the respective applications. The at least one application-specific file is generated via canonical transformation from the generated object specifications in XML presentation.

15 Claims, 3 Drawing Sheets

METHOD FOR GENERATING APPLICATION SPECIFIC INPUT FILES

FIELD OF THE INVENTION

This invention relates to a method for generating application-specific input files for applications, such as simulators, optimizers, model-based prediction control (MPC), process data validation, planning systems, abnormal situation management systems, asset management systems or diagnostic systems that require input files in varying file formats, based on XML(extensible Markup Language)-formatted files.

DESCRIPTION OF THE PRIOR ART

Most of the time, information models are stored in proprietary formats such as those used by databases, such as Oracle (for example, see George Koch and Kevin Loney, Oracle 8: The Complete Reference (Oracle Series), Oracle Press, September 1997) or object-oriented modeling tools, such as Rational Rose (for example, see Terry Quatrani, "Visual Modeling with Rational Rose 2000 and UML", Addison Wesley, 1999). Also, the presentation of information models in the form of XML Document Type Definitions [DTDs] (for example, see Simon St. Laurent and Robert Biggar, "Inside XML DTDs", McGraw-Hill, 1999), or XML diagrams (for example, see James Rumbaugh, Ivar Jacobson, and Grady Booch, "The Unified Modeling Language Reference Manual", Addison-Wesley, 1999) is becoming increasingly important.

Such XML-based formats have the following advantages compared to proprietary formats: People are able to read them—with the use of editors—and they are portable, i.e. they can be used in various types of computers and operating systems. Furthermore, the generation and reading in (parsing) of XML is supported by standard tools, such as the Microsoft XML-DOM (Document Object Model) parser.

Also, proposals for generating application-specific input files from an XML file have been made, such as XSL/CSS/XSLT (Extensible Stylesheet Language/Cascading Style Sheets/Extensible Stylesheet Language Transformations), or a graphic imaging tool (mapper tool), which was announced by the BizTalk initiative. However, the known methods have the problems described below.

In many new systems XML is selected as the formalism for the persistent presentation of information in order to avoid proprietary formats. The use of XML for presenting data models, however, is faced by several restrictions: XML is not object-oriented, i.e. central concepts of object orientation such as (classes, transmission, associations) do not exist in XML. Consequently, they have to be mapped on the simpler presentation means of XML.

Similar problems exist with data types: XML DTDs do not support any data structures. XML diagrams are able to display only primitive data types, such as character sequences and numbers. Both standards lack explicit support for lists and vectors. Therefore, these also have to be reproduced by means of simpler XML concepts.

Therefore, the aim of the present invention is to provide a method for automated generation of application-specific input files in varying file formats based on XML-formatted files and preventing the above disadvantages.

The problem is solved by a method for generating application-specific input files for applications, such as simulators, planning systems or diagnostic systems, which require input files in varying file formats, the method having the characteristic features of claim 1. An advantageous embodiment is provided in a further claim.

Accordingly, with the method of the invention input files are generated on the basis of a common class model for external application programs. The class model specifies the domain, for example the manufacturing industry, specifically the process industry, and in particular the chemical and petrochemical industry, refineries, the oil and gas industry, energy-producing industry, foodstuff and consumer goods industry, pharmaceutical industry, pulp and paper industry, metal producing and processing industry and the raw materials industry.

They are persistently stored in XML format. Project-specific instance data and information for configuring the applications (external applications) exist for this general class model. All this information is available in the form of XML files. The external applications are programs for completing various tasks on the basis of the common class model and the project data. Examples of such applications are equation-based simulation and optimization, parameter estimates, model-based prediction control (MPC), process data validation, planning, abnormal situation management, asset management and diagnostics.

The applications are programs that were developed separately or purchased from third parties, each having varying and non-compatible input formats. The method works in the manner of an open system and permits the integration of future applications with new formats which cannot be altered by the user.

SUMMARY OF THE INVENTION

A method for generating at least one application specific input file for applications that require input files in varying file formats, where data for specifying industrial equipment are stored in a database of a computer system as XML-formatted files based on a class model, and an automated modular transformation into said at least one application-specific input file takes place in one or more phases, the method having the steps of:

(a) loading one or more of the XML formatted files into a memory of the computer system, the loaded one or more XML formatted files decoded and subjected to semantics and consistency verification to produce in the absence of a detected error one or more verified XML files;

(b) generating, by means of an interface containing descriptions of the respective applications, specifications of objects of the industrial equipment in XML format based on the one or more verified XML files; and (c) generating the at least one application-specific input file using a canonical transformation from the generated object specifications in XML format.

DESCRIPTION OF THE PREFERRED EMBODIMENTS

Figure 1:
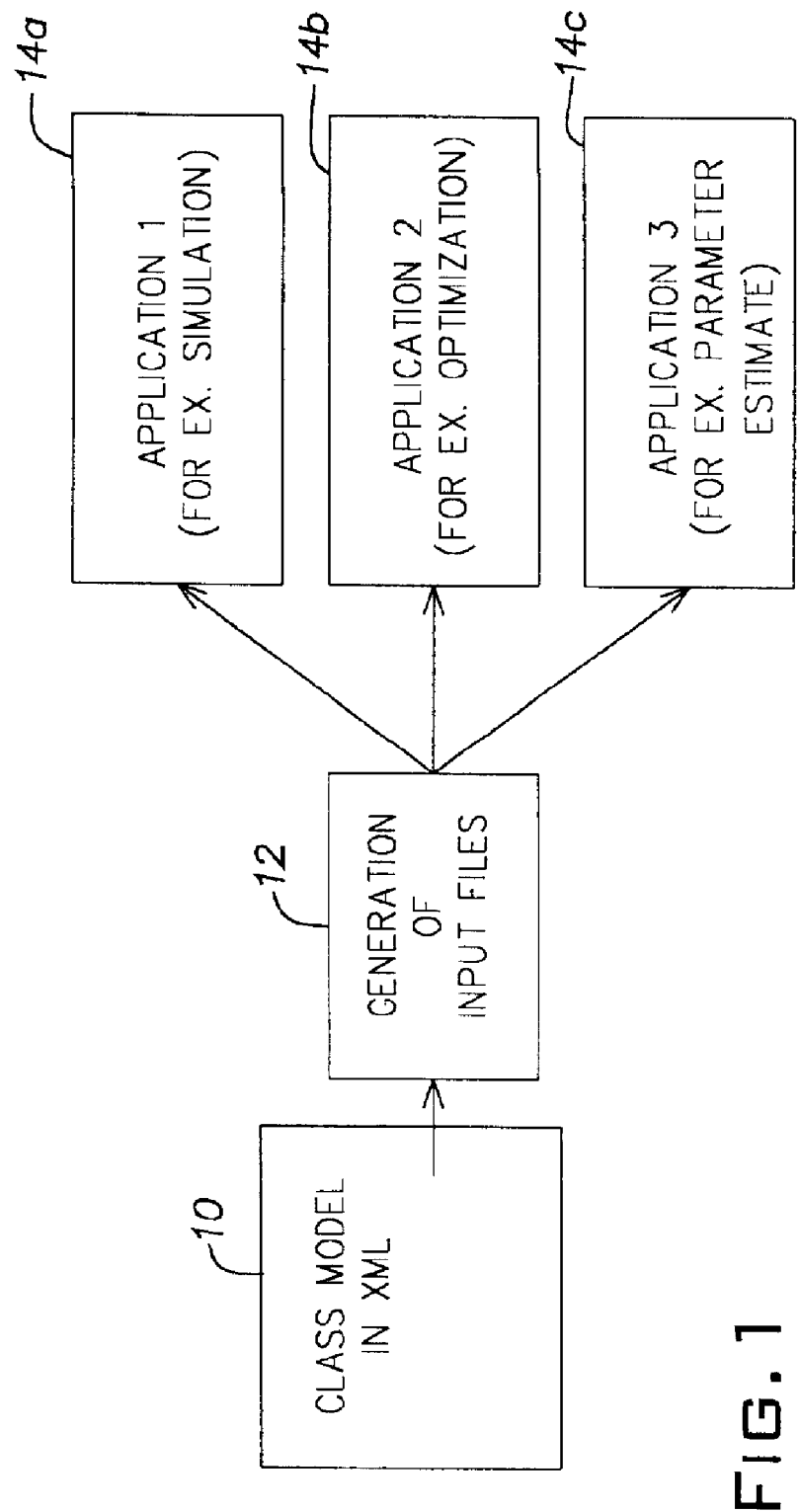
FIG. 1 shows an overview of the method of the present invention.

FIG. 1 shows a diagram of the method of the invention, with which a modular transformation of classes and instances presented in XML into application-specific formats is carried out automatically.

For such a generation of application-specific input files from a class model the existing limitations of XML have to be taken into consideration. The components of the XML file which correspond to the class model 10 have to be interpreted as classes, associations, lists, etc. before the application-specific input files 12 can be generated. This interpretation step, which leads from the fundamental writing means of the XML file back to the original object-oriented model, is not supported by the known tools for XML conversion (XSL, mapper tool).

Furthermore, the concepts on which the input files of external applications are based differ considerably from the concepts of the class model used here. This is unavoidable because most of these applications are products from different manufacturers which the user of the method cannot alter. The XML files contain the domain model, the instance data for the project and the necessary configuration data for the applications. Current conversion methods, such as XSL, primarily support direct mapping of elements of the source language (in this particular case the class model) to elements of the target language (in this particular case the application-specific input formats). However, complex relationships between source and target formalism are required for the intended application such as the applications 14a, 14b and 14c shown in FIG. 1. In order to generate a section of an application-specific input file several classes of the class model have to be read and put into relation with several objects of the project instances. The objects may appear in the source files in any sequence.

Another disadvantage of earlier solutions is the lack of modularity of the format conversion. The complete translations from the XML presentation into the application-specific format is specified in one step. In the application, which is made possible by the invention, the transformation is complex and therefore it is completed in phases. Furthermore, several varying external applications are advantageously supported. The similarities between the translation requirements for the various applications are utilized in that partial transformations between the applications are reused in the modular transformation.

Figure 2:
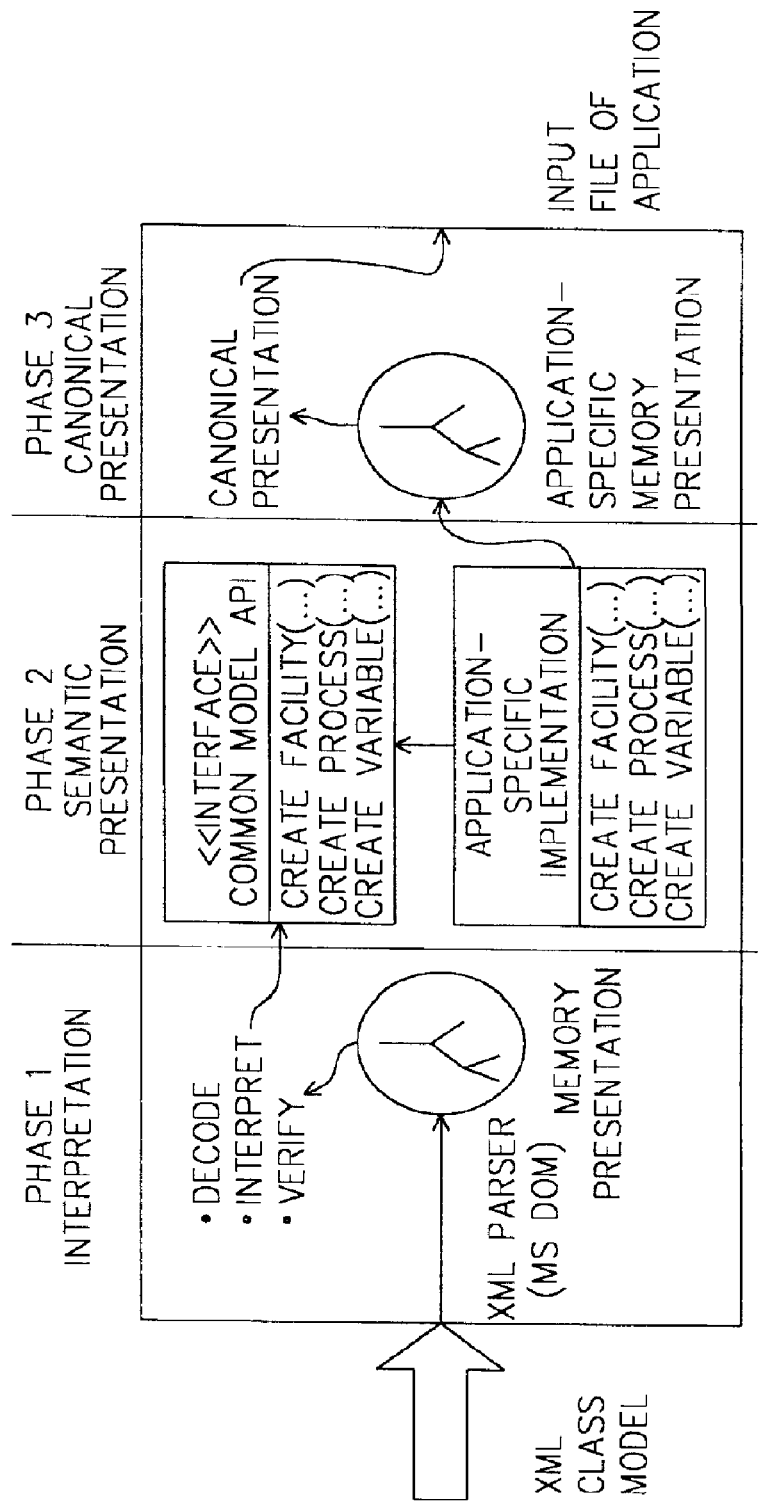
FIG. 2 shows the transformation phases of the method.

FIG. 2 shows the three phases of the transformation.

In Phase 1, an XML file describing the class model is loaded into the memory of a computer system, where it is decoded and subjected to semantics verification and consistency verification.

Phase 1 preferably includes the following steps: In a first step, the XML DOM parser is used for loading the file(s) into the memory. This is followed by semantics verification. The result is a DOM structure.

In a second step, the information, which is present as a DOM structure, is decoded and interpreted. An example of this interpretation process is the treatment of lists: In XML, lists are presented as interlaced structures of elements. The interlaced structure is read, interpreted as a list, and the list object intended in the model is stored in the memory.

The object structures generated as a result of the interpretation are subsequently verified for consistency. Such verifications are required because as a result of the expression weakness of XML the consistency is not ensured by the XML syntax verification alone. For example, this step will verify whether an object, which is referenced in an association, does in fact exist. If an error is found the automated transformation process is aborted with an error message.

The functionality of the following Phase 2 is defined by an interface which is referred to as a Common Model API in this case. The interface provides a generating method for each class of the class model. As soon as all the information required for generating an object, for example a system component (facility) has been collected, the respective generating method, for example createFacility, will be called up with the collected information as parameters.

The implementation of the generating method, for example createFacility, is application-specific. Consequently, an implementation of the Common Model API exists for every external application to be supported. The implementation specifies how the object has to be presented in the input file format of the application.

As described above, most of the external applications to be supported might have been purchased and developed without taking the common model into consideration. Such applications will expect the information in a combination and sequence which differs from the class model and the project data. If, for example, a component read in the XML presentation has to be recorded in the input format of an equation-based simulator this is not possible before a second object, for example a chemical process enabled by the component, has also been read and interpreted.

For this reason, the application-specific implementation of the Common Model API is unable to generate the input file directly. Instead, it generates a second internal presentation which is based on the structure of the input file to be generated. In the case of the equation-based simulation an XML-DOM memory structure is used, for example, which conforms precisely with the structure of the simulator input file. In Phase 2, the implementation of the Common Model API will insert all read-in information, for example the facility object, into the memory structure at the appropriate place.

In Phase 3, the memory structure, which now contains all information, is read fully and based on this, the input file of the application, for example of the simulator, is generated. This last step is referred to as a canonical transformation because of the 1:1 relationship between the elements of the memory structure and the elements of the input file, and thus the memory structure merely serves to insert the information in the desired sequence which would not be possible in the text file. Phase 3 is completely separate from the class model and therefore it does not have to be changed when the class model changes.

Figure 3:
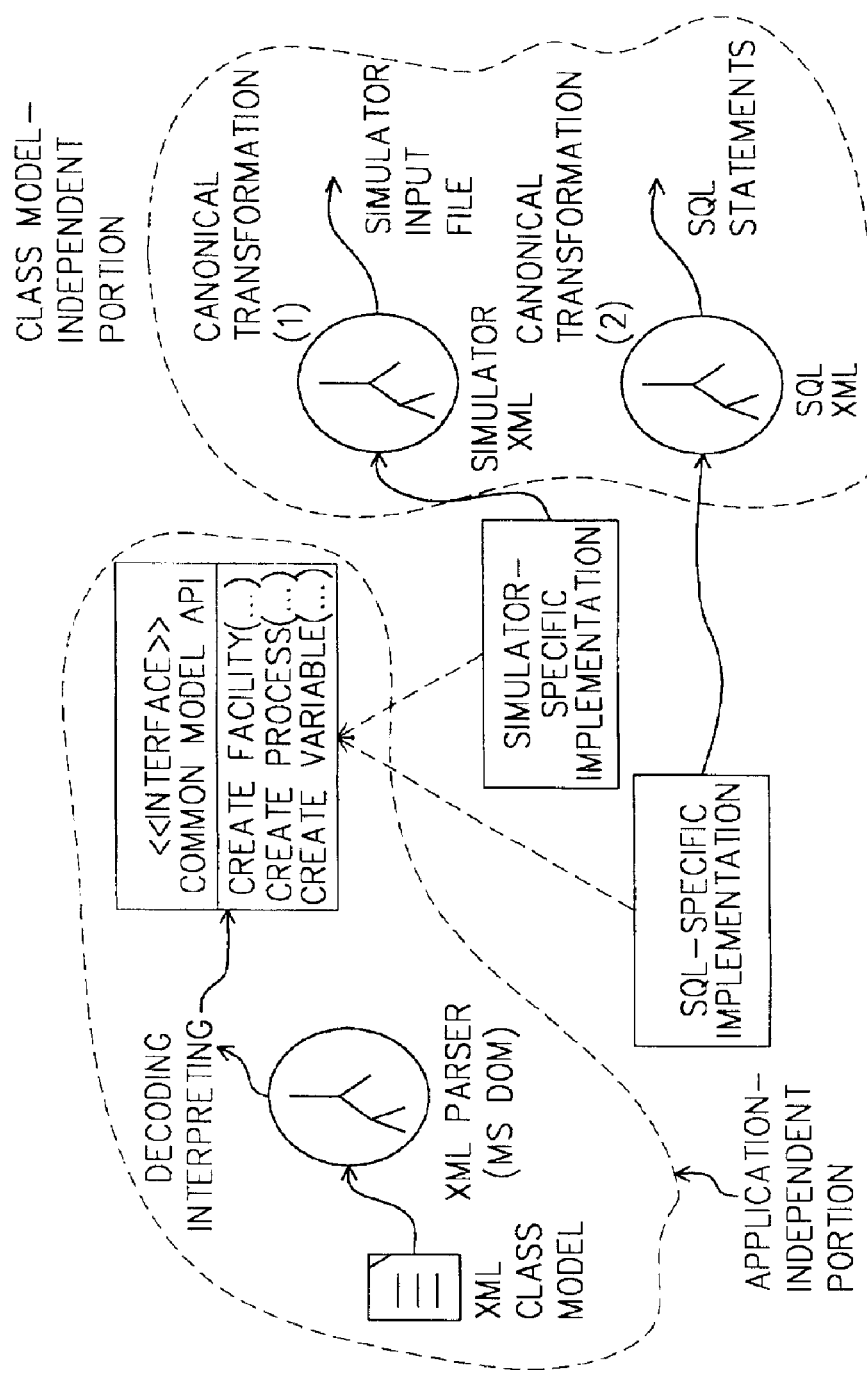
FIG. 3 shows a presentation of the modularity and reusability of the method.

FIG. 3 illustrates the advantages of the method when several external applications are supported. It shows how the phases are reused in the example of an equation-based simulator and an SQL database for storing the simulation results. The elements of Phases 1 and 2, including the Common Model API, are identical in the two transformations and have to be implemented only once. While the implementations of Phase 3 are application-specific, they do not have to be adapted when the class model changes because they are separate.

Therefore, the proposed three-phase transformation offers the following advantages:

The modularity of the transformation facilitates the formulation of the complex translation process.

Parts of the transformation may be reused unaltered in the translation processes for various applications.

The introduction of a neutral layer (the Common Model API) offers a higher independence with regard to changes in the standards and proprietary solutions at both ends of the transformation (structure of class model/structure of external applications).

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for generating at least one application specific input file for applications that require input files in varying file formats, where data for specifying industrial equipment are stored in a database of a computer system as XML-formatted files based on a class model, and an automated modular transformation into said at least one application-specific input file takes place in one or more phases, said method comprising the steps of:

(a) loading one or more of said XML formatted files into a memory of said computer system, said loaded one or more XML formatted files decoded and subjected to semantics and consistency verification to produce in the absence of a detected error one or more verified XML files;

(b) generating, by means of an interface containing descriptions of the respective applications, specifications of objects of industrial equipment in XML format based on said one or more verified XML files, said generated object specifications having a structure that corresponds to a predetermined structure of the at least one application-specific input file, which is different from a structure of the class model; and (c) generating said at least one application-specific input file using a canonical transformation from said generated object specifications in XML format.

2. The method of claim 1 where said automated modular transformation is aborted when an error is detected in said loading step.

3. The method of claim 1 wherein said one or more phases is three phases and said loading step is the first of said three phases.

4. The method of claim 1 where said one or more XML formatted files are loaded into said memory by means of an XML DOM parser, and a DOM structure results from said semantics verification.

5. The method of claim 4 further including the step of decoding and interpreting said DOM structure to generate one or more objects.

6. The method of claim 5 further including the step of verifying said one or more objects for consistency.

7. The method of claim 1 where said applications that require input files in varying file formats are selected from a class of applications that include at least simulators, planning systems or diagnostic systems.

8. The method of claim 1 where said class model specifies a domain.

9. The method of claim 8 where said domain is a manufacturing industry.

10. The method of claim 9 where said manufacturing industry is a process industry.

11. The method of claim 10 where said process industry is a chemical and petrochemical industry, refineries, an oil and gas industry, an energy-producing industry, a foodstuff and consumer goods industry, a pharmaceutical industry, a pulp and paper industry, a metal producing and processing industry and a raw materials industry.

12. A method of using project information comprising:

providing an application program that utilizes input files having a predetermined structure;

providing an XML file containing the project information, said XML file being based on a class model;

generating a first object-oriented model from the XML file;

generating a second object-oriented model from the first object-oriented model, said second object-oriented model having a structure corresponding to the predetermined structure of the application program;

generating an input file for the application program from the second object-oriented mode using a canonical transformation; and performing a task with the application program using the input file.

13. The method of claim 12, wherein generating the first object-oriented model comprises DOM parsing the XML file and verifying for semantics to produce a DOM structure.

14. The method of claim 13, wherein generating the first object-oriented model comprises:

decoding and interpreting the DOM structure to generate one or more objects; and verifying the one or more objects for consistency.

15. The method of claim 12, wherein the application program is selected from the group consisting of simulators, optimizers, model-based prediction control systems, process data validation systems, planning systems, abnormal situation management systems, asset management systems and diagnostic systems.

* * * * *